United States Patent [19]

Bartholomew

[11] Patent Number: 4,951,975
[45] Date of Patent: Aug. 28, 1990

[54] COUPLING FOR CONDUITS

[75] Inventor: Donald D. Bartholomew, Marine City, Mich.

[73] Assignee: Proprietary Technology, Inc., Southfield, Mich.

[21] Appl. No.: 264,076

[22] Filed: Oct. 24, 1988

[51] Int. Cl.⁵ .............................................. F16L 17/00
[52] U.S. Cl. .................................. 285/111; 285/308; 285/319; 285/424
[58] Field of Search ............... 285/308, 315, 111, 319, 285/424

[56] References Cited
U.S. PATENT DOCUMENTS 4,593,943 6/1986 Hama et al. ......................... 285/308

FOREIGN PATENT DOCUMENTS 2503550 9/1975 Fed. Rep. of Germany ...... 285/308
2060106 4/1981 United Kingdom ................ 285/315

*Primary Examiner*—Dave W. Arola
*Attorney, Agent, or Firm*—Harness, Dickey & Pierce

[57] ABSTRACT

A coupling for attaching a conduit to an external member includes a female housing having a passageway formed therein and extending axially therealong and communicating with the external member. A retainer is disposed in the passageway for retaining the conduit when inserted into the passageway and in response to a withdrawing movement of the conduit from the passageway. A bushing is disposed in the passageway and cooperating with the retainer for allowing disengagement of retainer with the conduit to allow the conduit to be withdrawn from said passageway.

14 Claims, 2 Drawing Sheets

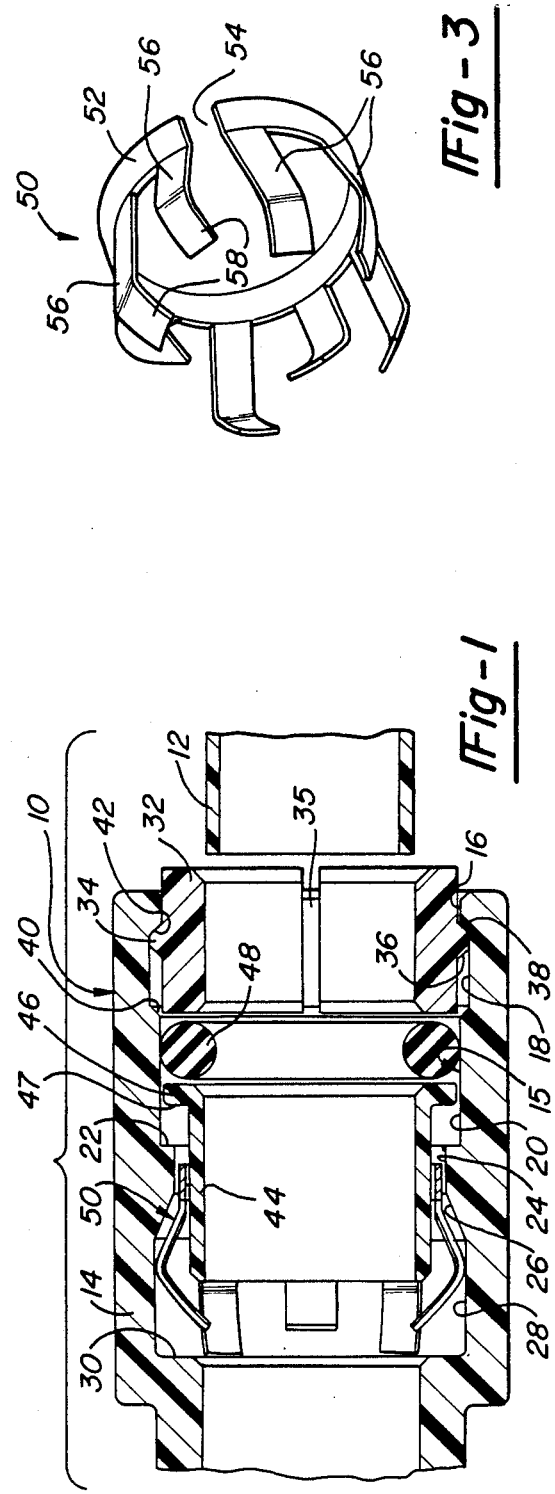
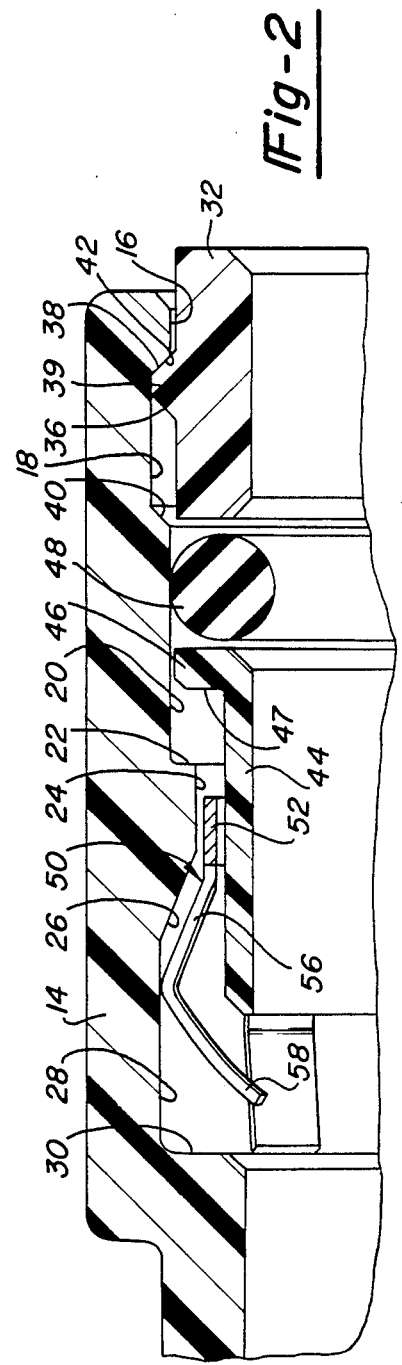

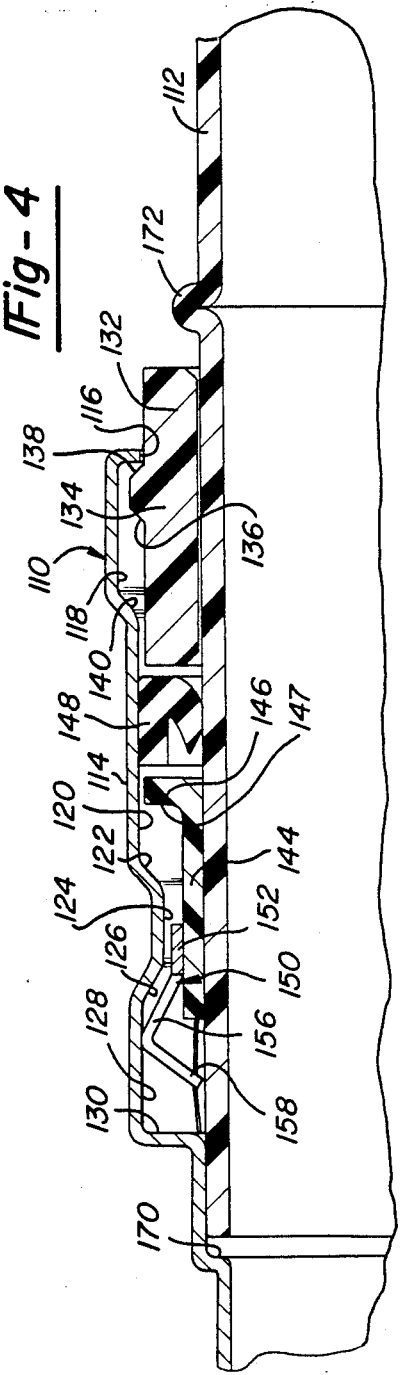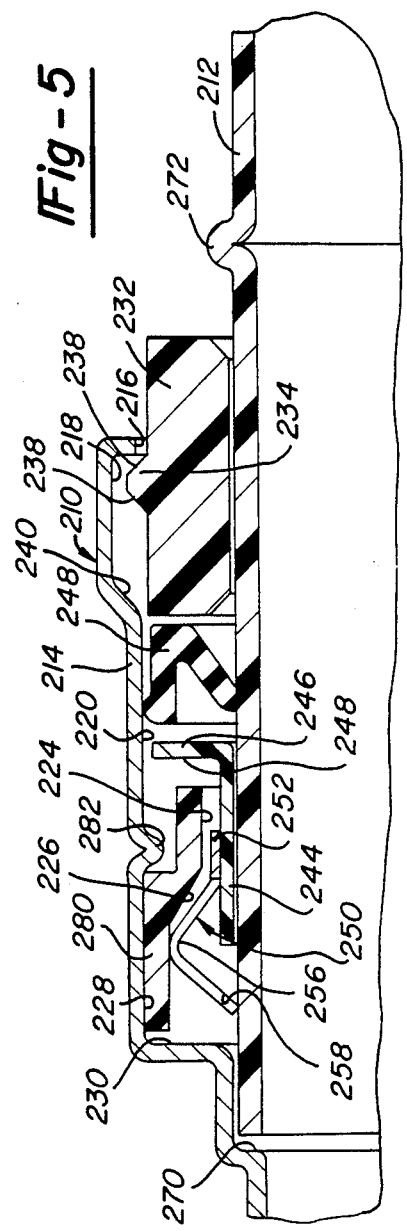

COUPLING FOR CONDUITS

BACKGROUND OF THE INVENTION

1. Field of the Invention

The present invention relates to couplings for conduits, more particularly to, releaseable couplings for conduits used in fluid installations.

2. Description of Related Art

Presently, there are many instances where a length of tubing must be sealably connected to another tube or device. Commonly, no bead is affixed or formed on the tube which can be used as a surface that cooperates to provide mechanical locking of the tube in the connector.

Examples of prior tube couplers are found in U.S. Pat. Nos.: 4,005,883; 4,178,023; 4,630,848; and 4,645,246. These patents show various mechanical gripper means that operate in a way that allows gripping of the tube while operating against an abutting wall that is part of the sealing and tube attaching means. When these devices are used, there is an attempt to emulate the attaching strength of the beaded tube types. It has not been recognized that the weakest element of the attachment is the gripping engagement of the gripper means itself.

As a result, couplings constructed with gripper type retention means are inherently inferior to couplings which employ interaction with a bead on the tubular male portion; but they are usable in many cases where lesser performance is adequate. It is, therefore, one object of the present invention to place grippers interiorly of the seal, so that during the installation of the tube, the sealing surface of the tube is not damaged by the grippers. It is another object of the present invention to provide a gripper releasing force that may be transmitted by the sealing member, while having the gripping means transfer the tube pull out forces to the housing, or have the releasing means provide the transfer of the tube pull out forces to the housing of the attaching means in cases where the sealing means will transfer the required forces without disruption of the seal. It is another object of the present invention to provide the attaching means so that the tube must be pulled as the releasing means is operated to effect release of the tube and to reduce the likelihood that an inadvertent release of the tube will occur.

SUMMARY OF THE INVENTION

Accordingly, the present invention is a coupling for attaching a conduit to an external member including a female housing having a passageway formed therein and extending axially therealong and communicating with the external member. A means is disposed in the passageway for retaining the conduit when inserted into the passageway and in response to a withdrawing movement of the conduit from the passageway. A bushing means is disposed in the passageway and cooperates with the retaining means for allowing disengagement of the retaining means with the conduit to allow the conduit to be withdrawn from the passageway. The bushing means is actuated by forces transmitted through a sealing means in response to a force applied to a release.

One advantage of the present invention is a tube coupling releasable by transmitting a releasing force and movement through and with the seal or seals. This makes it possible to construct a low cost connector. Another advantage of the present invention is the retention of the tube by means of an easily insertable or removable metal stamping. A further advantage of the present invention is the retention of the retainer and sealing means by an easily insertable and optionally removable releasing means. This makes it possible for an easily formed interior that allows a low cost female housing and very straight forward automated or hand assembly of the attaching means. These factors promote very low cost relative to other devices which perform a similar function.

A still further advantage of the present invention is a coupling manufactured using either plastic or metal materials for the attaching means. This allows use of plastic or metal housings in situations where the lowest cost may be achieved, or because the housing must be threaded into another device. Another advantage of the present invention is an attachment which may be constructed so as to be hand releasable, or special tool releasable according to user desire. A further advantage of the present invention is an attachment where a location indicator may be used on the tube to indicate a properly assembled connection. In this respect, even a bead which does not require a specified functional shape may be used if desired.

Another advantage of the present invention is an attachment which may be constructed so as to have a combination metal outside housing that is lined with plastic parts to form the inside shape of the housing. A further advantage of the present invention is an attachment that is easily combined with a check valve, filter, pump, or other system device means. A still further advantage of the present invention is an attachment wherein the tube is swivelable within the housing to relieve system stresses that arise from twisting motions by forming the retainer so that it rotates within the housing more easily than the tube rotates within the retainer.

Another advantage of the present invention is an attachment which may be constructed to accommodate a variety of shapes and materials for the sealing means. A further advantage of the present invention is in avoiding corrosion problems on metal tubings that result from gripping means breaking corrosion treatment surface on metal tubes in a location exterior to the sealing means.

Other advantages of the present invention will be readily appreciated as the becomes better understood by reference to the following detailed description when considered in connection with the accompanying drawings.

BRIEF DESCRIPTION OF THE DRAWINGS

FIG. 1 is a sectional elevational view of a coupling constructed in accordance with the principles of the present invention, and a tube to be sealably attached thereto.

FIG. 2 is an enlarged sectional elevational view of the coupling of FIG. 1.

FIG. 3 is a perspective view of the retainer portion of the attachment.

FIG. 4 is a sectional elevational view of a first alternate embodiment of the attachment and collapsing releaser constructed in accordance with the principles of the present invention.

FIG. 5 is a sectional elevational view of a second alternate embodiment of the attachment and collapsing releaser constructed in accordance with the principles of the present invention.

DESCRIPTION OF THE PREFERRED EMBODIMENTS

Referring to FIGS. 1 and 2, a coupling 10 for coupling a conduit 12 which is used in fluid installations is shown. The coupling 10 includes a female housing 14 connected to a device (not shown) such as a check valve, filter, pump or the like. The female housing 14 is preferably a generally annular tube having a centrally disposed generally annular passageway 15 formed in it along its longitudinal axis. The female housing 14 may be constructed of plastic, metal or any other suitable material. The interior of the female housing 14 is formed to a particular shape which cooperates with the components that are disposed within female housing 14. It should be appreciated that the interior shape may be formed in a number of ways.

The passageway 15 has an outermost portion 16 at its opening and an enlarged locking portion 18 axially inward from the outermost portion 16. The internal diameter (I.D.) of the outermost portion 16 is smaller than the I.D. of the locking portion 18. The passageway 15 also has a sealing portion 20 adjacent axially of the locking portion 18. The female housing 14 includes a first wall or shoulder 22 formed at one end of the sealing portion 20 and extending radially inwardly of the passageway 15. The I.D. of the sealing portion 20 is approximately the same diameter as the outermost portion 16 in the embodiment shown, but this is not a necessary relationship for a properly functioning coupling. The wall 22 has an axial portion 24 and a conically tapering portion 26 tapering radially outwardly. The passageway 15 further includes a retainer interior portion 28 extending axially from one end of the tapering portion 26. The retainer portion 28 has an I.D. large enough to provide a clearance pocket for the retainer 50. The female housing 14 includes a second wall or shoulder 30 extending radially inwardly at one end of the retainer portion 28. The second wall 30 provides an innermost portion 31 of the passageway 15 which has an I.D. slightly larger than the outside diameter (O.D.) of the tube 12. The innermost portion 31 may act as a bushing portion to center the conduit 12 in the retaining member 50 to be described.

The coupling 10 also includes a releasing member 32 disposed within the passageway 15 near the open end of the female housing 14. The releasing member 32 is generally tubular and has an I.D. slightly larger than the O.D. of the conduit 12. The releasing member 32 has a radially outwardly extending projection 34 disposed in the locking portion 18. The releasing member 32 snaps into the locking portion 18 such that the projection 34 is locked in the locking portion 18. This may be accomplished either by compressing the releasing member 32 and/or possibly expanding the diameter at the open end of the female housing 14. This expansion can be facilitated by a series of slots in the female housing 14 parallel to the longitudinal axis of the female housing 14. The compression of releasing member 32 may be facilitated by fabricating the releasing member 32 as an incomplete ring with the ends forming a gap 35 that allows for easier compressing of the releasing member 32, which springs back to its original diameter upon the releasing member 32 entering the locking portion 18 of the female housing 14. The projection 34 has tapered side walls 36 and 38 which limit the movement of releasing member 32 in portion 18 by means of walls 40 and 42.

The coupling 10 also includes a generally annular bushing member 44 having a flange portion 46 at one end. The bushing member 44 is disposed within the passageway 15 with the flange portion 46 disposed within the sealing portion 20. The inner face 47 of the flange portion 46 cooperates with the first wall 22 to limit the axial movement of the bushing member 44.

The coupling 10 further includes a sealing member 48 such as an O-ring disposed within the sealing portion 20 of the passageway 15. The sealing member 48 is made of a material such as rubber which is sufficiently elastic to function as a seal, and transmit releasing forces inward on the releasing member 32 to the flange portion 46 of the bushing member 44.

The coupling 10 includes a retaining member, generally indicated at 50, for functionally engaging and gripping the conduit 12 to secure it within the coupling 10. Referring to FIG. 3, the retaining member 50 has a partial ring or band 52 made of a thinwall metal. The ends of this band 52 form a space or gap 54. The retaining member 50 also has a plurality of fingers 56 extending axially from ring 52. The fingers 56 are of type which engage the conduit 12, and operatively cooperate with the female housing 14 to limit inward movement of retaining member 50 in the female housing 14. The fingers 56 are "overbent" so that the effective diameter formed by the ends 58 of fingers 56 is smaller than the O.D. of the conduit 12. The fingers 56 have spring characteristics that cause a pre-load gripping on the conduit 12 that is necessary to cause retaining member 50 to move with the conduit 12. The fingers 56 are disposed in the retainer portion 28 which acts as a clearance pocket for them. At the end of the retainer portion 28 is the second wall 30 which provides a stop to limit the inward motion of the fingers 56. When fingers 56 engage the second wall 30, further inward movement of the retaining member 50 is prevented.

In manufacture, the retaining member 50 may be fabricated so that fingers 56 establish the installed diameter of ring 52 and the bushing member 44 moves easily relative to retaining member 50. Fingers 57 are also fabricated as part of ring 52, and act against wall 30 to limit movement of retainer 50 in clearance bore 28. It should be appreciated that all of the internal parts may be mounted on a pin and installed into the female housing 14. In manufacture, tapered diameter area 26 is the limiting factor of a single unit plastic housing. It is possible on plastic moldings to "pop" off the core pin (of the injection molding tool) diameter difference sufficient to provide the tapered portion 26 of the passageway 15 that is sufficient to achieve proper operation of the retaining member 50 and gripping of the conduit 12. The retaining member 50 may be made by means that do not produce an incomplete ring, but a rolled-up stamped strip that works well and is inexpensive to manufacture.

In operation, a conduit 12 is inserted into the passageway 15. The fingers 56 of retaining member 50 apply a force to squeeze or grip the conduit 12. When the fingers 57 engage the second wall 30, further inward movement of the retaining member 50 is prevented. Also, the movement of the bushing member 44 is such that before its inward motion is limited, the inner end of the bushing member 44 interacts with the fingers 56 of the retaining member 50 in a manner which spreads the fingers 56, disrupting their gripping action on the conduit 12. The wall 30 and retaining fingers 57 prevent the retaining member 50 from being displaced inward to an extent sufficient to prevent the bushing member 44 from causing the fingers 56 of the retaining member 50 from being opened. An attempt to remove the tube 12 from the female housing 14 causes the retaining member 50 to be moved with the conduit 12. This movement causes the ends 58 of the fingers 56 to be driven into tighter gripping engagement with the conduit 12 as a result of the ends 58 that touch area being forced into the smaller diameters of the tapered portion 26.

To release the conduit 12, the releasing member 32 is moved axially inward, in turn, moving the sealing member 48 and bushing member 44. The bushing member 44 spreads the fingers 56, disrupting their gripping action on the conduit 12 and allowing the conduit 12 to be removed or withdrawn from the passageway 15.

Referring to FIG. 4, a first alternate embodiment 110 of the coupling 10 is shown. Like parts of the embodiment 10 have like numerals increased by 100. The coupling 110 includes a female housing 114 which is thin-walled and typically a deep drawn stamped part. It should be appreciated that the coupling 110 could also be representative of a metal or plastic machined part, as could the female housing 14 in FIG. 2. In the coupling 110, the conduit 112 operatively cooperates with a stop formed by a third wall 170 of the female housing 114 to limit the depth of the insertion. The conduit 112 can be formed with a bead or outwardly extending projection 172 which ascts as an installation depth indicator.

The tapered portion 126 of the passageway 115 is formed as a secondary operation after original manufacture of a blank with a shape in the area like that shown by the dotted line. This blank would be mounted on a mandril ending at second wall 130 from first 122. The dotted area would be rolled inward, the added material being supplied by forming to a smaller diameter, and a reshaping of that area around 130. It should be appreciated that it is not necessary that the tapered portion 126 be any exact shape, the large radii that would result from the secondary roll forming operation would be satisfactory. Additionally, the sealing member 148 is formed as a modified "U-cupped" type seal. The operation of the coupling 110 is similar to that of the coupling 10.

Referring to FIG. 5, a second alternate embodiment 210 of the coupling 10 is shown. Like parts of the embodiment 10 have like numerals increased by 200 and like parts of the first alternate embodiment have like numerals increased by 100. The coupling 210 has a female housing 214 and a conically tapered member 280 to form the tapered portion 226 of the passageway 215. The tapered member 280 cooperates with the fingers 256 of the retaining member 250. The tapered member 280 is retained in the female housing 214 by a formed inwardly extending indentation 282. The operation of the coupling 210 is similar to that of the coupling 10.

As previously described, attachments of the gripper type are not as reliable in demanding mechanical situations as the bead locking type because the shear cross-section and engaging area for shear forces is very limited in gripper types. Gripper types also, because of the small area of shear cross-section involved in the gripping or locking, are very sensitive to the edge conditions of the gripping means that interact with the tube. For the gripping types to work properly, the gripping means must indent the tube surface and form a "pocket" that is sufficient to withstand the mechanical shaking and pull-out forces that are experienced in real world applications. For this reason, the gripper types are used almost exclusively on soft metal or plastic tubing if the user is being conservative and careful. This is because soft metal or plastic tubing is more easily deformed to achieve the desired "pocket." It is noted that plastic tubing does not transmit shaking forces as well as metal tubing. When gripper types are used with metal tubing, the tubing must be of a soft metal, a benefit of the gripper being located inward of the sealing means is that when the grippers disrupt any corrosion treatment, the disruption is not exposed to the exterior environment. Having the end of the tube 12 pass through the sealing member 48 prior to any disruption caused by the gripping means such as the retaining member 50 is a real benefit for first time use reliability.

The present invention has been described in an illustrative manner. It is to be understood that the terminology which has been used is intended to be in the nature of words of description rather than of limitation. Obviously, many modifications or variations of the present invention are possible in light of the above teachings. Therefore, within the scope of the appended claims, the present invention may be practiced otherwise than as specifically described.

What is claimed is:

1. In a pressure or vacuum confining system, a coupling for connecting a tubular member to a mating member into which said tubular member is inserted, said mating member comprising:

a female housing:

said female housing having an interior being shaped so as to accept into the open end said tubular member, a gripping means, release bushing means, sealing means, and a retainer release operator;

said gripping means including a discontinuous band enabling insertion into said female housing and at least two spring like means, one of said spring like means adapted to engage said tubular member, the other spring like means cooperating with said interior of said female housing interior to prevent said gripping means from being translated into said female housing to an extend sufficient to disrupt a gripping releasing motion, both of said spring like means extending from said discontinuous band and with said first spring like means cooperating with said female housing preventing withdraw of said tubular member in response to a withdrawing movement of said tubular member;

said releasing bushing positioned in said interior of said female housing and shaped in a manner that said releasing bushing is operated to release said gripping means by the movement of said sealing means;

said sealing means constructed so as to seal the interior of said female housing to the exterior of said tubular member and be located between said releasing bushing and said retaining releasing operator; and a retaining releasing operator constructed in a manner such that said operator may be installed into said female housing, and once installed, resist removal from said female housing, whereby the retaining releasing operator being constructed so as to be moveable within said housing in a manner that will cause movement of said sealing means in response to an outside force applied to said retainer releasing means for purpose of releasing said tubular element from said mating member.

2. A coupling for attaching a conduit to an external member, comprising:
- a female housing having a passageway formed therein and extending axially therealong and communicating with the external member;
- means for retaining the conduit when inserted into said passageway, said means disposed in said passageway and including a discontinuous band means enabling insertion into said female housing and at least two spring means, one of said spring means adapted to engage said conduit, the other spring means cooperating with said interior of said female housing interior to prevent said retaining means from being translated into said female housing to an extent sufficient to disrupt a retaining releasing motion, both of said spring means extending from said discontinuous band and said first spring means cooperating with said female housing preventing withdraw of said conduit;
- bushing means disposed in said passageway and cooperating with said retaining means for allowing disengagement of said retaining means with the conduit to allow the conduit to be withdrawn from said passageway.

3. The coupling as set forth in claim 2 including sealing means for sealing the interior of said female housing to the exterior of the conduit.

4. The coupling as set forth in claim 3 including releasing means disposed in said passageway and being moveable therein for causing movement of said sealing means to actuate said bushing means in response to an outside force applied to said releasing means.

5. A coupling for attaching a conduit to an external member, comprising:
- a female housing having a passageway formed therein and extending axially therealong and communicating with the external member;
- means for engaging and retaining the conduit when inserted into said passageway, said means disposed in said passageway and including a discontinuous band means enabling insertion into said female housing and at least two spring means, one of said spring means adapted to engage said conduit, the other spring means cooperating with said interior of said female housing interior to prevent said retaining means from being translated into said female housing to an extent sufficient to disrupt a retaining releasing motion, both of said spring means extending from said discontinuous band and said first spring means cooperating with said female housing preventing withdraw of said conduit in response to a withdrawing movement of said contuit from said passageway;
- bushing means disposed in said passageway and cooperating with said retaining means for allowing disengagement of said retaining means with the conduit to allow the conduit to be withdrawn from said passageway;
- sealing means for sealing the interior of said female housing to the exterior of the conduit; and
- releasing means disposed in said passageway and being moveable therein for causing movement of said sealing means to actuate said busing means in response to an outside force applied to said releasing means.

6. The coupling as set forth in claim 5 wherein said retaining means first spring means includes at least two spring like members adapted to engage the conduit and cooperate with the female housing to prevent withdraw of the conduit in response to a withdrawing movement of the conduit.

7. The coupling as set forth in claim 6 wherein said passageway includes a locking portion formed by axially opposed walls of said female housing which cooperate with said projection to limit the axial movement of said releasing means.

8. The coupling as set forth in claim 7 wherein said bushing means comprises a tubular bushing having a flange extending radially outwardly therefrom.

9. The coupling as set forth in claim 8 wherein said female housing includes a wall extending radially inwardly into said passageway and cooperating with said flange to limit the movement of said bushing.

10. The coupling as set forth in claim 9 wherein said sealing means comprises an O-ring.

11. The coupling as set forth in claim 9 wherein said sealing means comprises a U-shaped annular sealing ring.

12. The coupling as set forth in claim 11 wherein said female housing is a thin-walled deep drawn stamped member.

13. The coupling as set forth in claim 12 wherein said female housing has a radially inwardly extending wall cooperating with the end of the conduit to limit the depth of insertion of the conduit into said coupling.

14. The coupling as set for the in claim 11 including a member disposed within said passageway and forming a tapered wall portion for cooperating with said spring like members.

* * * * *